United States Patent
Wang (10) Patent No.: US 9,866,913 B1
(45) Date of Patent: Jan. 9, 2018

(54) BINARY TV

(71) Applicant: TCL RESEARCH AMERICA INC., San Jose, CA (US)

(72) Inventor: Haohong Wang, San Jose, CA (US)

(73) Assignee: TCL RESEARCH AMERICA INC., San Jose, CA (US)

(*) Notice: Subject to any disclaimer, the term of this patent is extended or adjusted under 35 U.S.C. 154(b) by 0 days.

(21) Appl. No.: 15/192,380

(22) Filed: Jun. 24, 2016

(51) Int. Cl.
*H04N 7/16* (2011.01)
*H04H 60/32* (2008.01)
*H04N 21/482* (2011.01)
*H04N 21/81* (2011.01)
*H04N 21/61* (2011.01)
*H04N 21/45* (2011.01)
*H04N 21/258* (2011.01)
*H04N 21/442* (2011.01)
*H04N 21/488* (2011.01)
*H04N 21/2187* (2011.01)

(52) U.S. Cl.
CPC ..... *H04N 21/4826* (2013.01); *H04N 21/2187* (2013.01); *H04N 21/25891* (2013.01); *H04N 21/44222* (2013.01); *H04N 21/4532* (2013.01); *H04N 21/4882* (2013.01); *H04N 21/6125* (2013.01); *H04N 21/812* (2013.01)

(58) Field of Classification Search
CPC ............. H04N 21/4826; H04N 21/812; H04N 21/6125; H04N 21/4532; H04N 21/25891; H04N 21/44222; H04N 21/4882; H04N 21/2187
See application file for complete search history.

(56) References Cited

U.S. PATENT DOCUMENTS

| 2008/0271078 A1* | 10/2008 | Gossweiler | H04N 5/44543 725/40 |
| 2015/0095932 A1* | 4/2015 | Ren | H04N 21/4383 725/22 |
| 2016/0035132 A1* | 2/2016 | Shuster | G06T 19/006 345/633 |
| 2016/0150274 A1* | 5/2016 | Bilobrov | H04N 21/4586 725/18 |

FOREIGN PATENT DOCUMENTS

| CN | 1330833 A | 1/2002 |
| CN | 102186036 B | 4/2013 |
| CN | 104580659 A | 4/2015 |

* cited by examiner

Primary Examiner — Oschta Montoya
(74) Attorney, Agent, or Firm — Anova Law Group, PLLC (57) ABSTRACT

A binary TV system and a method for a binary TV system are provided. The binary TV system comprises a TV program managing module configured to acquire a user preference for TV programs, and generate messages of recommended actions to be performed by a TV; a content recommender module configured to analyze the user preference and generate a recommendation of TV programs matching the user preference; a channel monitoring module configured to monitor and recognize a current TV program a user is watching; an advertisements (Ads) detecting module configured to detect advertisements in a specific TV channel; and a TV controlling module configured to send the messages generated by the TV controlling module to the TV. The user and the TV is communicated with each other through a binary interaction.

16 Claims, 5 Drawing Sheets

BINARY TV

FIELD OF THE INVENTION

The present invention relates generally to the field of computer technologies and, more particularly, to a binary TV system.

BACKGROUND

Televisions (TVs) are one of the most important and universal entertainment devices for human being, and many TV technologies have been developed in this field. Sources of TV programs are often divided into two categories: live broadcasting and OTT (Over-The-Top) streaming. For the live broadcasting TV programs, user experience is mostly limited to linear watching experience, i.e., users have to follow the program flow and have very limited interactions to switch the programs. Besides, the users have to suffer the tedious built-in advertisements in the live broadcasting TV programs. For the OTT streaming TV programs, the users have much more flexibility in selecting videos to watch, and can fast play forward or paly backward to any time point of the videos.

However, the live broadcasting TV programs and the OTT streaming TV programs have completely different styles of controlling. When introducing these two TV programs into one system (e.g., a TV), the system and the corresponding remote controlling device may become substantially complex to many audiences, especially to audiences in lean-back mode or senior audiences who are not that familiar with those advance electronic devices.

The disclosed systems and methods are directed to solve one or more problems set forth above and other problems.

BRIEF SUMMARY OF THE DISCLOSURE

One aspect of the present disclosure includes a binary TV system. The binary TV system comprises a TV program managing module configured to acquire a user preference for TV programs, and generate messages of recommended actions to be performed by a TV; a content recommender module configured to analyze the user preference and generate a recommendation of TV programs matching the user preference; a channel monitoring module configured to monitor and recognize a current TV program a user is watching; an advertisements (Ads) detecting module configured to detect advertisements in a specific TV channel; and a TV controlling module configured to send the messages generated by the TV controlling module to the TV. The user and the TV is communicated with each other through a binary interaction.

One aspect of the present disclosure includes a method for a binary TV system comprising a TV program managing module, a content recommender module, a channel monitoring module, an advertisements (Ads), and a TV controlling module, the method comprises acquiring a user preference for TV programs; analyzing the user preference; generating a recommendation of TV programs matching the user preference; sending the recommendation of TV programs to a TV; sending the recommendation of TV programs to a user; and responding to the recommendation of TV programs through a binary interaction between the user and the TV.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides an improved TV system, called a binary TV system, which may provide an improved TV user experience to the users, especially to audiences in lean-back mode or to senior audiences who seldom use mobile devices. The binary TV system may be able to understand the user preference very well, making a good program recommendation to the user; aware of the current program (no matter live broadcasting or OTT) that a user is watching by using automatic content recognition (ACR); monitor a live TV channel and recognize the Ads in the TV programs, thus allowing the user to optimize the Ads time; and allow the user to particularly specify his/her interests in certain TV programs, even to specify the interests in certain TV programs designed for his/her kids.

The design of the binary TV system may follow human being's natural logic in binary decision-making process, and the user may only have to make an immediate binary decision (e.g., yes or no) when receiving a query or a request from TV, without relying on a complex remote controlling device, e.g. a TV remote control. Such simple user experience may be achieved by transferring most of the intelligence and computing to the backend of the binary TV system and/or a cloud server.

Figure 1:
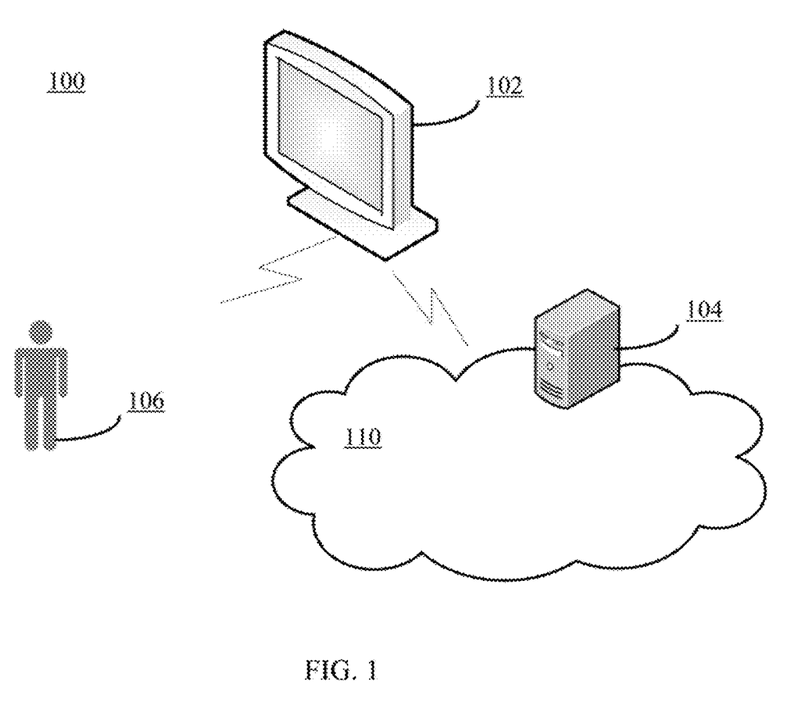
FIG. 1 illustrates an exemplary environment incorporating certain embodiments of the present invention.

FIG. 1 illustrates an exemplary environment 100 incorporating certain embodiments of the present invention. As shown in FIG. 1, the environment 100 may include a user terminal 102, a server 101, a user 106, and a network 110. Other devices may also be included.

The user terminal 102 may include any appropriate type of electronic device with computing capabilities, such as TVs (smart TVs or non-smart TVs), a smart watch, a mobile phone, a smartphone, a tablet, a personal computer (PC), a server computer, a laptop computer, and a digital personal assistant (PDA), etc. Further, the user terminal 102 may be any appropriate content-presentation device capable of presenting texts, images, videos, etc.

The server 101 may include any appropriate type of server computer or a plurality of server computers for providing personalized contents to the user 106. The server 101 may also facilitate the communication, data storage, and data processing between the other servers and the user terminal 102. The user terminal 102, and server 101 may communicate with each other through one or more communication networks 110, such as cable network, phone network, and/or satellite network, etc.

The user 106 may interact with the user terminal 102 to query and to retrieve various contents and perform other activities of interest, or the user may use voice, hand or body gestures to control the user terminal 102 if speech recognition engines, motion sensor or depth-camera is used by the user terminal 102. The user 106 may be a single user or a plurality of users, such as family members.

Figure 2:
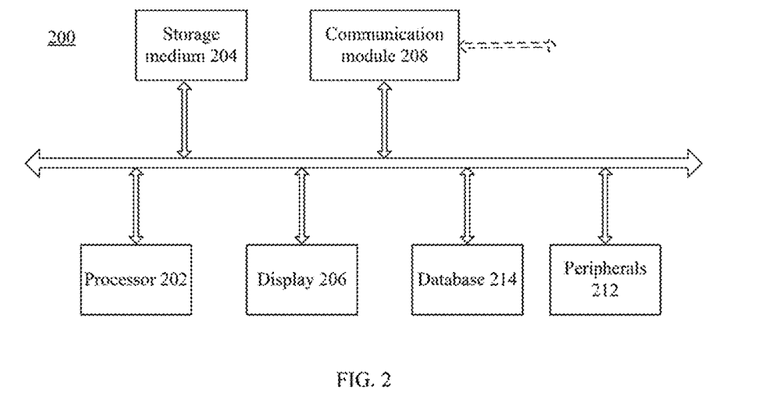
FIG. 2 illustrates an exemplary computing system consistent with disclosed embodiments.

The user terminal 102, and/or server 101 may be implemented on any appropriate computing circuitry platform. FIG. 2 shows a block diagram of an exemplary computing system capable of implementing the user terminal 102, and/or server 101

As shown in FIG. 2, the computing system 200 may include a processor 202, a storage medium 204, a display 206, a communication module 208, a database 314, and peripherals 312. Certain components may be omitted and other components may be included.

The processor 202 may include any appropriate processor or processors. Further, the processor 202 can include multiple cores for multi-thread or parallel processing. The storage medium 204 may include memory modules, such as ROM, RAM, flash memory modules, and mass storages, such as CD-ROM and hard disk, etc. The storage medium 204 may store computer programs for implementing various processes, when the computer programs are executed by the processor 202.

Further, the peripherals 212 may include various sensors and other I/O devices, such as keyboard and mouse, and the communication module 208 may include certain network interface devices for establishing connections through communication networks. The database 214 may include one or more databases for storing certain data and for performing certain operations on the stored data, such as database searching.

Figure 3:
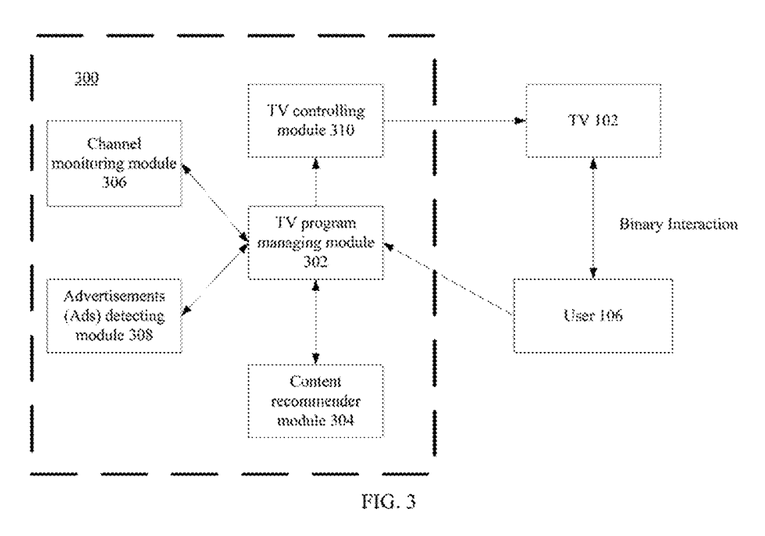
FIG. 3 illustrates an exemplary binary TV system consistent with disclosed embodiments.

Returning to FIG. 1, the user terminal 102 and/or server 104 may implement the binary TV system to realize a binary interaction with the user 106. FIG. 3 illustrates an exemplary binary TV system consistent with disclosed embodiments. As shown in FIG. 3, the binary TV system 300 may include a TV program managing module 302, a content recommender module 304, a channel monitoring module 306, an advertisements (Ads) detecting module 308 and a TV controlling module 310. It should be noted that, in the disclosed embodiments, the binary TV system 300 is not only limited to television system, but includes all video entertainment systems, such as projection-based, PC-based, set-top-box/stick based, and mobile-based solutions, etc.

In one embodiment, as shown in FIG. 3, the binary TV system 300 may be implemented into the user terminal 102, e.g., a TV. The TV 102 may also be called as a binary TV. The binary TV system 300 may be configured to realize a binary interaction between the user 106 and the binary TV 102. That is, the user 106 may interact with the binary TV 102 based on a binary interaction method.

For example, the binary TV system 300 may send messages, regarding various actions the binary TV 102 are going to take, to the user 106 through audio or visual approaches. If the user 106 agrees the binary TV 102 to take a desired action, he/she may give a positive response, e.g., "yes". If disagrees, he/she may give a negative response, e.g., "no". If the user 106 does not give any reaction or response to the binary TV 102, the binary TV 102 may treat it as the negative response, i.e., "no".

The user's response, i.e., "yes" or "no" expressed by speech and/or gestures, may be sent back to the binary TV 102 directly or through a remote control. The user 106 may also use voice, hand or body gestures to send his/her response, when speech recognition engines, motion sensor or depth-camera are installed in the binary TV system 300.

In particular, the TV program managing module 302 may serve as a central management point of the binary TV system 300. The user 106 may specify his/her interests in certain programs to the binary TV system 300, and the TV program managing module 302 may be configured to acquire the user interests, and then send the acquired user interest to the content recommender module 304. In addition, the TV program managing module 302 may be configured to command the channel monitoring module 306 to monitor and recognize what the user 106 is currently watching, for example, the channel of the live broadcasting TV or the title of the OTT video, and then command the content recommender module 304 to recommend a next TV program to the user 106.

When the content recommender module 304 detects that a pre-specified live TV program is on, the content recommender module 304 may be configured to report to the TV program managing module 302. Then the TV program managing module 302 may be configured to generate a message for the TV controlling module 310 to pass to the binary TV 102. The TV program managing module 302 may also be configured to use the Ads detecting module 308 to detect whether the Ads periods start in the current program, and communicate with the user 106 regarding whether to skip the Ads by switching to another TV program through the TV controlling module 310.

The content recommender module 304 may be configured to manage the contents for the user 106 to view. The content recommender module 304 may be a highly personalized module, which may be configured to learn the user's viewing habits and recommend personalized content from a live TV electronic programming guide (EPG) and a OTT title list to the user 106.

For example, if a live TV program that the user 106 is interested in is on, the content recommender module 304 may be configured to notify the TV program managing module 302 to generate a message, which may be transferred to the binary TV 102 by the TV controlling module 310, such that the user 106 may be able to decide whether to watch or not. On the other hand, the content recommender module 304 may also be configured to recommend popular TV programs that have been watched a lot to the user 106.

Further, when the user 106 is close to finish watching a video, the TV program managing module 302 may be configured to request the content recommender module 304 to recommend a next TV program to the user 106. The content recommender module 304 may be configured to keep recommending until the user 106 accepts a recommendation by answering "Yes", through using the binary interaction method as discussed above.

The channel monitoring module 306 may be configured to monitor and recognize the current TV program the user 106 is watching by using ACR (Automatic Content Recognition) technology. The ACR may be based on, for example, audio fingerprints, and visual fingerprints, etc. Based on a report generated by the channel monitoring module 306, the TV program managing module 302 may be configured to find an associated $2^{nd}$-screen content for the current video title and command the TV controlling module 310 to push the content to the user 106 via the binary TV 102 or the $2^{nd}$ screen.

The Ads detecting module 308 may be configured to detect the Ads in a specific TV channel by matching the fingerprints of the current TV audio/video with the fingerprint of Ads database. For example, such a matching may be realized by adopting a content (e.g., video, audio) retrieval system. Content retrieval may involve isolating a sequence of "feature" in a piece of audio or video, and such a set of feature may be referred as a "fingerprint" of the audio sequence.

The concept of fingerprint, when used in audio retrieval systems, is the function to map an audio object that consists a large number of bits to a limited number of bits which could be called fingerprint. The fingerprint needs to be sufficiently distinguishable, so that two fingerprints can be reliably separated from each other or regarded similar to each other.

For video retrieval, a single frame from a video sequence may be discriminable enough to be searched in a large dataset. This enables each frame itself being an independent unit, regardless of what inter-frame information is. Thus, proper frames or representative frames may be used instead of collecting all of the continuous frames for database search, redundant inter-frame information may be unnecessary.

The term "video fingerprinting" may refer to a technique in which software identifies, extracts, and then compresses characteristic components of a video, enabling that video to be uniquely identified by its resultant "fingerprint". Such technique may include key frame analysis, color and motion changes sequential analysis, feature and object analysis, camera shot analysis, etc., and the analysis results may then be used as the fingerprints of the video sequence.

A successful match between the fingerprint of the current TV audio/video and the fingerprint of Ads database may indicate the current TV program is in an Ads time period, otherwise not. Thus, the Ads detecting module 308 may be configured to track a TV channel and detect whether an Ads time period starts or ends, and then notify the TV program managing module 302 through sending a report. Once received the report, the TV program managing module 302 may be configured to notify the TV controlling module 310 to notify the user 106 to make a binary decision.

The TV controlling module 310 may be configured to send messages and controls, generated by the TV program managing module 302, to the binary TV 102 as well as other TV related devices, for example, set-top boxes, and projectors, etc. Then the binary TV 102 may send corresponding messages to the user 106 through visual, audio or other interaction approaches.

The binary TV system 300 may allow the user 106 to simplify the TV watching through making a substantially few binary decisions. For example, through the binary interaction, the binary TV system 300 may allow the user 106 to decide whether to accept a recommended TV program or OTT video to watch, whether to switch to another recommended TV program or OTT video, whether to skip the Ads and switch to another TV program or OTT video, and whether to return to the previous channel after the Ads ends, etc., all of which may meet the normal needs of the lean-back user and simplify the TV watching. The Binary TV system 300 may also learn the user's behavior and update the recommendations based on the interaction between the user 106 and the binary TV 102.

Figure 4:
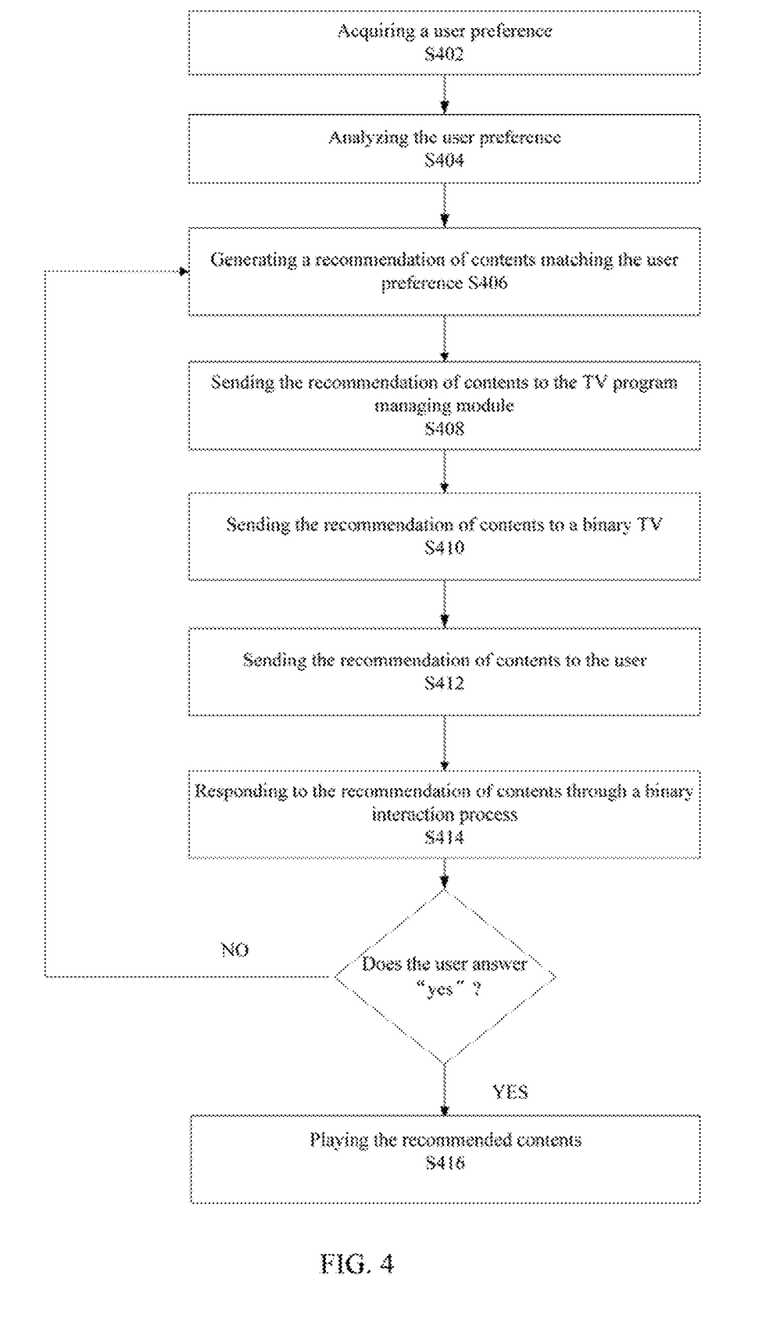
FIG. 4 illustrates a flow chart of an exemplary binary TV process consistent with disclosed embodiments.

The present disclosure also provides a binary TV system method. FIG. 4 illustrates a flow chart of an exemplary binary TV process consistent with disclosed embodiments. As shown in FIG. 4, at the beginning, the TV program managing module may acquire user's interests or preference in the TV programs (S402). For example, the TV program managing module may acquire user's interests according to the information of watched TV programs entered by the user, and TV program watching history obtained from the binary TV, etc.

After acquiring the user preference, the TV program managing module may send the user preference to the content recommender module. The content recommender module may analyze the user preference (S404). Based on the analyzed user preference, the content recommender module may generate a recommendation of TV programs matching the user preference (S406) and send the recommendation of TV programs to the TV program managing module (S408). In particular, the recommendation of TV programs matching the user preference may include a live TV EPG, an OTT title list, and an OTT video matching the user preference, etc.

Further, the TV program managing module may send the recommendation of TV programs matching the user preference TV to the binary TV through the TV controlling module (S410), for example, when the content recommender module detects a live TV program matching the user preference and/or a pre-specified live TV program, when the Ads detecting module detects the current TV program is in an Ads time period, and when the channel monitoring module detects the current TV program or the current OTT video is ending, etc.

Further, the binary TV may send the recommendation of TV programs matching the user preference to the user (S412). In particular, the binary TV may send the recommendation of TV programs matching the user preference to the user through visual, audio or other interaction approaches. After receiving the recommendation of TV programs matching the user preference, the user may respond to the recommendation of TV programs through a binary interaction process (S414). That is, the user may respond by expressing "yes" or "no" in speech and/or gestures, which may be sent back to the binary TV directly or through a remote control.

If the user answers "yes", the binary TV may play the recommend contents (S416). If the user answers "no", the binary TV may not take any action, while the content recommender module may generate a next recommendation of TV programs matching the user preference (S406) based on the user's response. The content recommender module may keep generating a recommendation of TV programs matching the user preference until the user says "yes".

Figure 5:
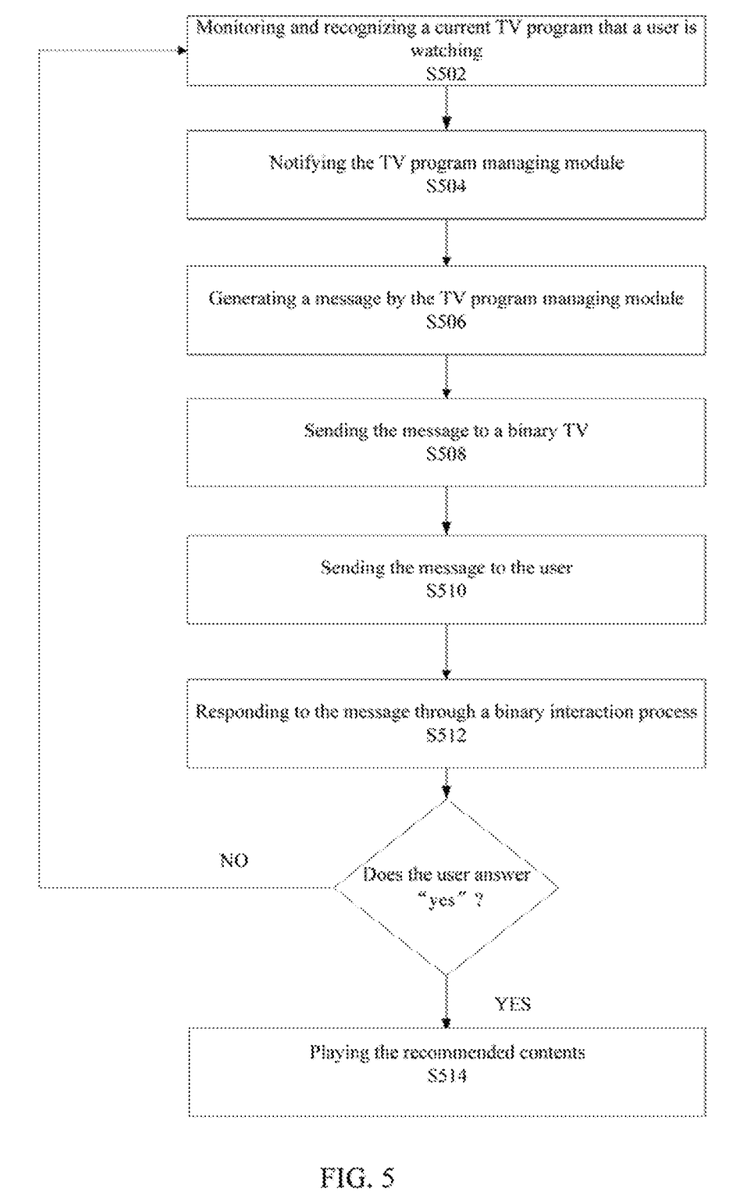
FIG. 5 illustrates a flow chart of an exemplary process of sending a recommendation of TV programs to a TV program managing module consistent with disclosed embodiments.

FIG. 5 illustrates a flow chart of an exemplary process of sending a recommendation of TV programs to a TV program managing module consistent with disclosed embodiments. As shown in FIG. 5, at the beginning, the channel monitoring module may monitor and recognize the current TV program the user is watching (S502). When the content recommender module detects a live TV program or a pre-specified live TV program matching the user preference is on, while the channel monitoring module detects that the user is currently watching a TV program at a different channel, the content recommender module may notify the TV program managing module (S504).

After receiving the notice, the TV program managing module may generate a message (S506) and the TV controlling module may send the message to the binary TV (S508). The message may include certain information of the current TV program, and the recommendation of the contents matching the user preference (i.e., the live TV program or the pre-specified live TV program matching the user preference), etc.

Then the binary TV may send the message to the user (S510), and the user may respond to the message through the binary interaction process (S512). If the user answers "yes", the binary TV may play the recommend contents (S514). If the user answers "no", the binary TV may not take any action and keep playing the current TV program, while the channel monitoring module may continue monitoring and recognizing the current TV program the user is watching (S502).

Figure 6:
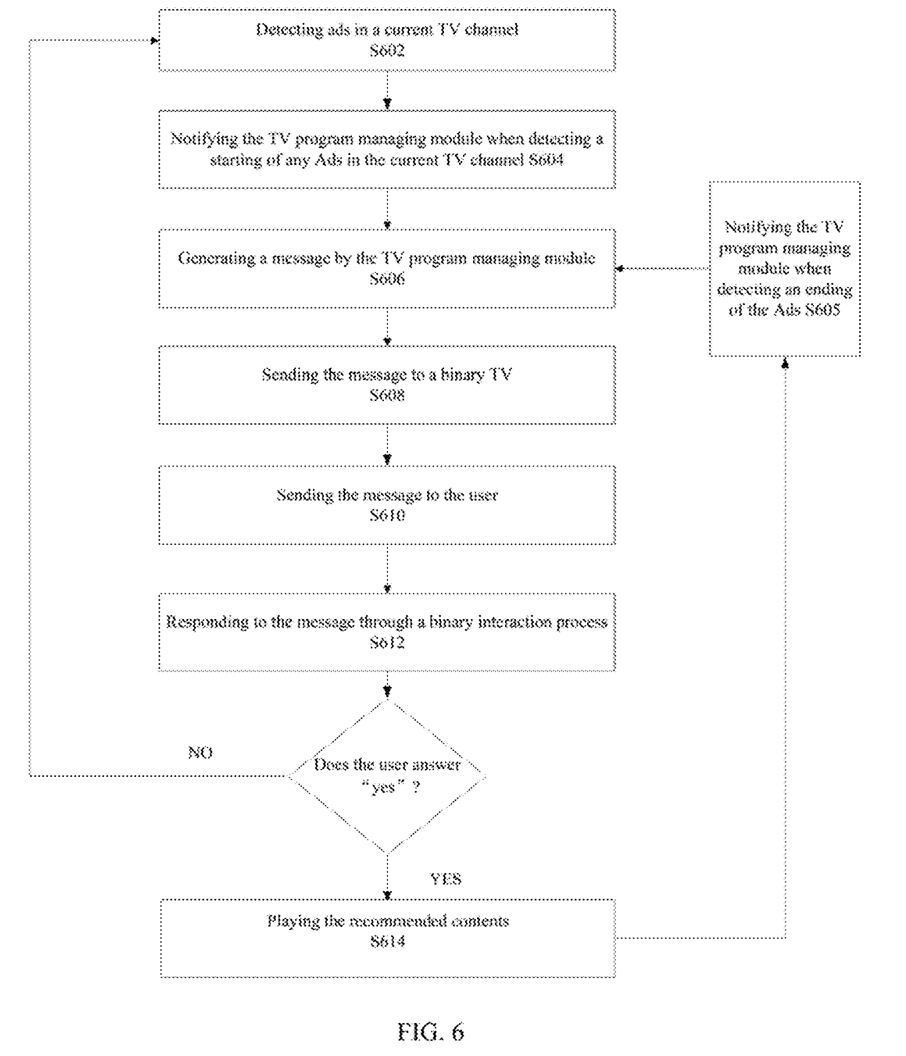
FIG. 6 illustrates a flow chart of another exemplary process of sending a recommendation of TV programs to a TV program managing module consistent with disclosed embodiments.

FIG. 6 illustrates a flow chart of another exemplary process of sending a recommendation of TV programs to a TV program managing module consistent with disclosed embodiments. As shown in FIG. 6, at the beginning, the Ads detecting module may detect the Ads in the current TV channel (S602). In particular, the Ads detecting module may detect the Ads matching the fingerprints of the current TV audio/video with the fingerprint of Ads database.

Once detecting the current TV program is in an Ads time period or a starting of any Ads, the Ads detecting module may notify the TV program managing module through sending a notice (S604). After receiving the notice, the TV program managing module may generate a message (S606) and the TV controlling module may send the message to the binary TV (S608). The message may include certain information of the current Ads, the recommendation of the contents matching the user preference, etc.

Then the binary TV may send the message to the user (S610), and the user may respond to the message through the binary interaction process (S612). If the user answers "yes", the binary TV may play the recommend contents (S614). If the user answers "no", the binary TV may not take any action but keep playing the Ads, while the Ads detecting module may keep detecting the Ads in the current TV channel (S602).

In particular, when the user says "yes" and the binary TV play the recommend contents instead of the Ads, for example, switching to another channel or play an OTT video, the Ads detecting module may notice the TV program managing module when detecting an ending of the Ads in the previous channel (S605).

For example, referring to FIG. 3 and FIG. 4, the TV program managing module 302 may acquire the user's interests based on TV program watching habits entered by the user or TV program watching history provided by the binary TV. The TV program managing module 302 may report the TV program watching habits to the content recommender module 304 and, meanwhile, command the channel monitoring module 306 to monitor and recognize what the user 106 is currently watching.

The content recommender module 304 may analyze and learn from the user's viewing habits, finding that the user is interested in watching NBA games. When the content recommender module 304 detects that a live stream of 2016 NBA game is on at ABC channel, while the channel monitoring module 306 detects that the user 106 is watching BBC, the content recommender module 304 may report the situation to the TV program managing module 302.

The TV program managing module 302 may generate a message for the TV controlling module 310 to send to the binary TV 102, and then the binary TV 102 may send the corresponding message to the user 106, for example, by sending a voice message "live steam of 2016 NBA game you are interested in on at ABC channel, do you want to switch to ABC channel?".

If the user 106 agrees to switch to ABC channel, he/she may just say "yes", and the speech recognition engines installed on the binary TV 102 may recognize the user's positive response and the binary TV 102 may take a corresponding action. The user 106 may also use predefined hand or body gestures to interact with the binary TV 102.

During watching the live steam of 2016 NBA game at ABC channel, once an advertisement is on, the Ads detecting module 308 may detect and track the advertisement, and send a report to the TV program managing module 302. The TV program managing module 302 may notify the binary TV 102 through the TV controlling module 310, and the binary TV 102 may interact with the user 106 to make a binary decision.

For example, the binary TV 102 may display a sentence "do you want to switch to FOX channel that you may be interested, we will switch you back after the Ads is over in this channel" or "do you want to watch an OTT video "2015 NBA game", we will switch you back after the Ads is over in this channel" on the TV screen. If the user agrees by expressing "yes", the binary TV 102 may take a corresponding action, i.e., switch the channel.

When detecting the advertisement is over, the Ads detecting module 308 may send a report to the TV program managing module 302, and the TV program managing module 302 may notify the binary TV 102 through the TV controlling module 310. The binary TV 102 may interact with the user 106, for example, by displaying a sentence "The advisement is over in the previous channel, do you want to switch back". If the user agrees by expressing "yes", the binary TV 102 may take a corresponding action. If the user disagrees by expressing "no" or does not give any response, the binary TV 102 may not take any action.

In the disclosed binary TV system and method, the user may only have to answer a few binary questions, i.e., expressing "yes" or "no", rather than understand the complicated TV remote control as well as the TV program content database. The binary TV system may understand the user preference, recommend the right content to the user, and remove Ads content, through adopting a series of technologies, such as personalized content recognition, content retrieval, automatic content recognition (ACR), advisements (Ads) management and recognition, etc., all of which may be realized through cloud services. Thus, the user experience of watching TV may be significantly improved, while the cost of hardware may be increased.

Further, the Binary TV system may be compatible with the current TV usage model having a remote control. The user may return to use the conventional way to control the TV at any time, i.e., through using the remote control to select a desired TV channel or TV program.

Those of skill would further appreciate that the various illustrative modules and method steps disclosed in the embodiments may be implemented as electronic hardware, computer software, or combinations of both. To clearly illustrate this interchangeability of hardware and software, various illustrative units and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein

What is claimed is:

1. A binary television (TV) system comprising:
   one or more processors,
   a memory coupled to the one or more processors, and
   a plurality of program modules stored in the memory to be executed by the one or more processors, the plurality of program modules comprising:
   a TV program managing module acquiring a user preference for TV programs, and generating messages of recommended actions to be performed by a TV:
   a content recommender module analyzing the user preference and generating a recommendation of TV programs matching the user preference;
   a channel monitoring module monitoring and recognizing a current TV program a user is watching;
   an advertisements (Ads) detecting module detecting advertisements in a specific TV channel;
   a TV controlling module sending the messages generated by the TV controlling module to the TV,
   wherein the user and the TV is communicated with each other through a binary interaction, and the advertisements are detected by matching an audio fingerprint and a visual fingerprint of the current TV program with an Ads fingerprint database, and a single frame of the current TV program without inter-frame information is used to match the visual fingerprint with the Ads fingerprint database;
   wherein the content recommender module further notifies the TV program managing module when the content recommender module detects the current TV program is ending;
   wherein the TV program managing module further requests the content recommender module to recommend a next TV program to the user;
   wherein the content recommender module further keeps updating the recommendation of TV programs until the user gives a positive response;
   when detecting an ending of the Ads in a previous TV channel, notifying the TV program managing module to generate a message of a recommended action to be performed by the TV;
   sending the message to the user; and
   responding to the message, by the user, through the binary interaction.

2. The binary TV system according to claim 1, wherein:
   the TV program includes at last one of live broadcasting TV programs and Over-The-Top (OTT) streaming TV programs.

3. The binary TV system according to claim 1, wherein:
   in the binary interaction between the user and the TV, the TV sends the message and the recommendation of TV programs to the user; and
   the user sends a positive response or a negative response to the TV through voice, predefined hand or body gestures.

4. The binary TV system according to claim 3, wherein:
   in the binary interaction between the user and the TV, no response from the user is treated as the negative response.

5. The binary TV system according to claim 1, wherein the Ads detecting module further notifies the TV program managing module when the Ads detecting module detects an Ads time period in the specific TV channel starts.

6. The binary TV system according to claim 1, wherein the Ads detecting module further notifies the TV program managing module when the Ads detecting module detects the Ads time period in the specific TV channel ends.

7. The binary TV system according to claim 1, wherein the content recommender module further notifies the TV program managing module when the content recommender module detects a TV program matching the user preference starts.

8. The binary TV system according to claim 1, wherein the TV program managing module further finds an associated $2^{nd}$ screen content for a current OTT video title; and commands the TV controlling module to push the content to the user through the TV or the $2^{nd}$ screen.

9. A method for a binary TV system comprising a TV program managing module, a content recommender module, a channel monitoring module, an advertisements (Ads), and a TV controlling module, the method comprises:
   acquiring a user preference for TV programs; analyzing the user preference;
   generating a recommendation of TV programs matching the user preference;
   sending the recommendation of TV programs to a TV;
   sending the recommendation of TV programs to a user;
   responding to the recommendation of TV programs through a binary interaction between the user and the TV;
   detecting advisements (Ads) in a current TV channel by matching an audio fingerprint and a visual fingerprint of a current TV program with an Ads fingerprint database, wherein a single frame of the current TV program without inter-frame information is used to match the visual fingerprint with the Ads fingerprint database;
   wherein the content recommender module further notifies the TV program managing module when the content recommender module detects the current TV program is ending;
   wherein the TV program managing module further requests the content recommender module to recommend a next TV program to the user;
   wherein the content recommender module further keeps updating the recommendation of TV programs until the user gives a positive response;
   when detecting an ending of the Ads in a previous TV channel, notifying the TV program managing module to generate a message of a recommended action to be performed by the TV;
   sending the message to the user; and
   responding to the message, by the user, through the binary interaction.

10. The method for a binary TV system according to claim 9, wherein the binary interaction between the user and the TV further includes:
    sending the recommendation of TV programs to the user, by the TV; and
    sending a positive response or a negative response to the TV through voice, predefined hand or body gestures, by the user.

11. The method for a binary TV system according to claim 10, wherein:
   in the binary interaction between the user and the TV, no response from the user is treated as the negative response.

12. The method for a binary TV system according to claim 9, further including:
   monitoring and recognizing a current TV program at a current TV channel that the user is watching;
   when detecting a live TV program or a pre-specified live TV program matching the user preference is on at another channel different from the current TV channel, notifying the TV program managing module to generate a message of a recommended action to be performed by the TV;
   sending the message to the user; and
   responding to the message, by the user, through the binary interaction.

13. The method for a binary TV system according to claim 12, further including:
   when receiving the positive response from the user, performing the recommend action.

14. The method for a binary TV system according to claim 9, further including:
   when detecting a starting of any Ads in the current TV channel, notifying the TV program managing module to generate a message of a recommended action to be performed by the TV;
   sending the message to the user; and
   responding to the message, by the user, through the binary interaction.

15. The method for a binary TV system according to claim 14, further including:
   when receiving the positive response from the user, performing the recommend action.

16. The method for a binary TV system according to claim 9, further including:
   when receiving the positive response from the user, performing the recommend action.

* * * * *